United States Patent

Matsuoka et al.

(10) Patent No.: US 6,818,731 B2
(45) Date of Patent: Nov. 16, 2004

(54) POLYAMIDE RESIN COMPOSITION (75) Inventors: Hideharu Matsuoka, Ibaraki (JP); Hideaki Oka, Ibaraki (JP); Koichi Uchida, Okayama (JP); Masahide Tsuzuki, Tokyo (JP); Koji Beppu, Tokyo (JP)

(73) Assignees: Kuraray Co., Ltd., Kurashiki (JP); Asahi Denka Co., Ltd., Tokyo (JP)

( * ) Notice: Subject to any disclaimer, the term of this patent is extended or adjusted under 35 U.S.C. 154(b) by 0 days.

(21) Appl. No.: 10/413,551

(22) Filed: Apr. 15, 2003

(65) Prior Publication Data

US 2003/0229162 A1 Dec. 11, 2003

(30) Foreign Application Priority Data

Apr. 15, 2002 (JP) ........................................ 2002-112344

(51) Int. Cl.[7] .............................. C08L 77/00; C08K 5/00
(52) U.S. Cl. ...................... 528/310; 528/170; 525/420; 525/432; 524/500; 524/600; 524/602; 524/606; 524/411; 524/412
(58) Field of Search ................................ 528/310, 322, 528/170; 524/411–412, 500, 600, 602, 606; 525/420, 432

(56) References Cited

U.S. PATENT DOCUMENTS

| | | | | |
|---|---|---|---|---|
| 5,670,608 A | * | 9/1997 | Oka et al. ................... | 528/322 |
| 5,681,879 A | * | 10/1997 | Yamamoto et al. ......... | 524/373 |
| 6,258,927 B1 | * | 7/2001 | Oka et al. ................... | 528/310 |
| 6,348,563 B1 | * | 2/2002 | Fukuda et al. .............. | 528/310 |
| 6,414,064 B1 | * | 7/2002 | Matsuoka et al. .......... | 524/404 |
| 6,500,881 B1 | * | 12/2002 | Galli et al. ................. | 523/205 |
| 2003/0045621 A1 | * | 3/2003 | Aramaki et al. ............ | 524/394 |
| 2003/0229162 A1 | * | 12/2003 | Matsuoka et al. ............ | 524/81 |

FOREIGN PATENT DOCUMENTS

| | | |
|---|---|---|
| EP | 1 186 634 | 3/2002 |
| JP | 61-275346 | 12/1986 |
| JP | 5-59274 | 3/1993 |
| JP | 9-227787 | 9/1997 |

* cited by examiner

*Primary Examiner*—P. Hampton Hightower
(74) *Attorney, Agent, or Firm*—Oblon, Spivak, McClelland, Maier & Neustadt, P.C.

(57) ABSTRACT

A polyamide resin composition contains 100 parts by weight of (A) a polyamide resin with a melting point of 270° C. to 340° C.;

0.2 to 20 parts by weight of (B) a compound represented by Formula (I)

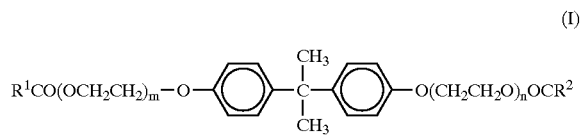

(I)

where $R^1$ and $R^2$ are alkyl groups having at least 9 carbon atoms, and m and n are integers from 1 to 3; and 1 to 100 parts by weight of (C) a bromine-based flame retardant.

17 Claims, 1 Drawing Sheet

FIG. 1

POLYAMIDE RESIN COMPOSITION

BACKGROUND OF THE INVENTION

1. Field of the Invention

The present invention relates to a polyamide resin composition which has excellent flowability and which can give a molded article with excellent mechanical strength, and heat resistance, and relates to a molded article composed of this composition.

2. Description of the Related Art

Aliphatic polyamides such as nylon 6 and nylon 66 have been used for engineering plastics in a variety of applications because of their excellent heat resistance, chemical resistance, rigidity, wear resistance, moldability, and so forth. In particular, when these aliphatic polyamides are used in electrical and electronic component applications, they need to have high flame retardance as set forth in UL-94, and, therefore, many different methods for making them flame resistant through the use of flame retardants have been proposed and put to practical use.

However, aliphatic polyamides can absorb water easily, which is a problem in that the resulting molded articles may cause dimensional change, blistering and reduction of physical properties. Furthermore, with electrical and electronics components which need to be made flame retardant, a mounting procedure called surface mounting technology (SMT) has rapidly gained acceptance because it allows components to be mounted in a higher density, makes the soldering process more efficient, and so forth. However, this approach cannot be applied to conventional aliphatic polyamides because of their low heat resistance. In particular, lead-free solder, which has a higher melting point than conventional lead solder, has recently become major due to environmental regulations, so the level of heat resistance required for SMT applications is even higher now. Also, SMT connectors have become thinner and lower in profile as the performance of cellular phones and personal computers has enhanced. In addition, injection molding, which allows numerous molded articles to be produced in one shot, has been employed recently in order to improve productivity, so there is now a need for a material that not only has good heat resistance, but also has high flowability and gives molded articles having excellent mechanical strength.

To this need, highly heat resistant semi-aromatic polyamides whose main component is a polyamide composed of terephthalic acid and an aliphatic alkylenediamine have come to be used in electrical and electronic component applications (see, for example, U.S. Pat. Nos. 5,258,439 and 5,256,718, Japanese Patent Application Laid-Open No. Hei5-320503, and International Patent Publication No. WO95/16737). Highly heat resistant aliphatic polyamides whose main component is a polyamide (PA46) composed of tetramethylenediamine and adipic acid, for example, have also been used. Furthermore, in addition to polyamides, resins with high heat resistance such as liquid crystal polymers (LCP) and polyphenylene sulfide (PPS) have also been used.

However, while the above-mentioned highly heat resistant semi-aromatic polyamides and aliphatic polyamides did have excellent mechanical strength and heat resistance, their flowability and blistering resistance were insufficient in applications where molded articles have been made thinner and lower in profile. The general method to increase flowability is to lower the molecular weight of a resin or a compound thereof. However, since this leads to a decrease in mechanical strength, there is a limit in application of this method to the above-mentioned highly heat resistant semi-aromatic polyamides and aliphatic polyamides.

Also, in the case of an LCP, flowability is excellent, but mechanical strength and sliding properties are poor, and in particular there is a marked decrease in mechanical strength at weld lines where the resins are joined together in an injected molded article, which frequently leads to cracking or wearing during the connector assembly process or in actual use, while in the case of PPS, flowability is low and molding is often difficult.

As described above, the situation is that a material that would satisfy these requirements has not yet to be proposed for SMT connector applications involving reduced thickness and profile height.

Meanwhile, Japanese Patent Application Laid-Open Nos. Sho60-243135 and Hei9-221566, for example, disclose that a fatty acid ester of an alkylene oxide adduct of a bisphenol has excellent heat resistance and is useful as a lubricant for a thermoplastic resin, a releasing agent, a surface lubricity enhancer, or the like. In particular, Japanese Patent Application Laid-Open No. Hei9-221566 lists nylon 6, nylon 66, nylon 11, nylon 12, nylon 46, nylon 610, nylon 612, aromatic polyamide, and other such polyamide resins as examples of thermoplastic resins. Unfortunately, these fatty acid esters did not adequately improve the flowability of polyamide resins.

SUMMARY OF THE INVENTION

It is an object of the present invention to provide a polyamide resin composition with excellent flowability as well as excellent blistering resistance, mechanical strength, and sliding properties, and a molded article composed of this composition.

As a result of diligent research to solve the above problems, the present inventors have completed the present invention based on the unexpected discovery that if a specific ester compound is blended with a polyamide resin having a high melting point, the resulting compound will have slightly improved flowability, and that flowability can be markedly improved by further blending with a bromine-based flame retardant.

Specifically, the present invention provides a polyamide resin composition comprising 100 parts by weight of (A) a polyamide resin with a melting point of 270° C. to 340° C.; 0.2 to 20 parts by weight of (B) a compound represented by Formula (I)

(I)

where $R^1$ and $R^2$ are alkyl groups with a carbon number of at least 9, and m and n are integers from 1 to 3; and 1 to 100 parts by weight of (C) a bromine-based flame retardant.

The present invention also provides a molded article composed of said polyamide resin composition.

DETAILED DESCRIPTION OF THE INVENTION

The present invention will now be described in detail.

The polyamide resin used as component (A) in the present invention has a melting point between 270 and 340° C. Blistering resistance will be reduced if the melting point of the polyamide resin is lower than 270° C. On the other hand, if it is higher than 340° C., the molding temperature will also be over 340° C., which means that the thermal stability of the polyamide resin and the bromine-based flame retardant will decrease, and moldability will also be lower.

Examples of the polyamide resin of component (A) include aliphatic polyamides such as PA46, and semi-aromatic polyamides composed of a dicarboxylic acid component including an aromatic dicarboxylic acid such as terephthalic acid or isophthalic acid, and a diamine component including an aliphatic alkylenediamine, such as PA6-6T, PA6-IT, PA66-IT, or PA9T. A semi-aromatic polyamide is preferred because of its heat resistance.

This semi-aromatic polyamide is composed of (a) dicarboxylic acid units and (b) diamine units.

In order to prevent the heat resistance of the polyamide resin composition from decreasing too much, the dicarboxylic acid units (a) contain preferably 50 to 100 mol % of terephthalic acid units, more preferably 60 to 100 mol %, still more preferably 75 to 100 mol %, and further still more preferably 90 to 100 mol %.

The dicarboxylic acid unit (a) may contain not more than 50 mol % of other dicarboxylic acid units besides terephthalic acid units. Examples of these other dicarboxylic acid units include units derived from aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid and suberic acid; alicyclic dicarboxylic acids such as 1,3-cyclopentanedicarboxylic acid and 1,4-cyclohexanedicarboxylic acid; and aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxy-diacetic acid, 1,3-phenylenedioxy-diacetic acid, diphenic acid, 4,4'-oxydibenzoic acid, diphenylmethane-4,4'-dicarboxylic acid, diphenylsulfone-4,4'-dicarboxylic acid and 4,4'-biphenyldicarboxylic acid. These can be used singly or in combinations of two or more types. The content of these other dicarboxylic acid units in the dicarboxylic acid units (a) is preferably not more than 40 mol %, more preferably not more than 25 mol %, and still more preferably not more than 10 mol %. Units derived from polyfunctionalized carboxylic acids such as trimellitic acid, trimesic acid, and pyromellitic acid may also be contained to the extent that melt molding is still possible.

In order to prevent the heat resistance, low water absorption, chemical resistance, and other such properties of the polyamide resin composition from decreasing too much, the diamine units (b) contain preferably 50 to 100 mol % of aliphatic alkylenediamine units having 6 to 18 carbon atoms, more preferably 60 to 100 mol %, still more preferably 75 to 100 mol %, and further still more preferably 90 to 100 mol %.

Examples of aliphatic alkylenediamine units having 6 to 18 carbon atoms include units derived from linear aliphatic alkylenediamines such as 1,6-hexanediamine, 1,7-heptanediamine, 1,8-octanediamine, 1,9-nonanediamine, 1,10-decanediamine, 1,11-undecanediamine and 1,12-dodecanediamine; and branched aliphatic alkylenediamines such as 1-butyl-1,2-ethanediamine, 1,1-dimethyl-1,4-butanediamine, 1-ethyl-1,4-butanediamine, 1,2-dimethyl-1,4-butanediamine, 1,3-dimethyl-1,4-butanediamine, 1,4-dimethyl-1,4-butanediamine, 2,3-dimethyl-1,4-butanediamine, 2-methyl-1,5-pentanediamine, 3-methyl-1,5-pentanediamine, 2,5-dimethyl-1,6-hexanediamine, 2,4-dimethyl-1,6-hexanediamine, 3,3-dimethyl-1,6-hexanediamine, 2,2-dimethyl-1,6-hexanediamine, 2,2,4-trimethyl-1,6-hexanediamine, 2,4,4-trimethyl-1,6-hexanediamine, 2,4-diethyl-1,6-hexanediamine, 2,2-dimethyl-1,7-heptanediamine, 2,3-dimethyl-1,7-heptanediamine, 2,4-dimethyl-1,7-heptanediamine, 2,5-dimethyl-1,7-heptanediamine, 2-methyl-1,8-octanediamine, 3-methyl-1,8-octanediamine, 4-methyl-1,8-octanediamine, 1,3-dimethyl-1,8-octanediamine, 1,4-dimethyl-1,8-octanediamine, 2,4-dimethyl-1,8-octanediamine, 3,4-dimethyl-1,8-octanediamine, 4,5-dimethyl-1,8-octanediamine, 2,2-dimethyl-1,8-octanediamine, 3,3-dimethyl-1,8-octanediamine, 4,4-dimethyl-1,8-octanediamine and 5-methyl-1,9-nonanediamine. These can be used singly or in combinations of two or more types.

Of the above-mentioned aliphatic alkylenediamine units, units derived from 1,6-hexanediamine, 1,8-octanediamine, 2-methyl-1,8-octanediamine, 1,9-nonanediamine, 1,10-decanediamine, 1,11-undecanediamine and 1,12-dodecanediamine are preferable, and of these, it is especially favorable to use 1,9-nonanediamine units and/or 2-methyl-1,8-octanediamine units. When 1,9-nonanediamine units and 2-methyl-1,8-octanediamine units are used together, it is preferable for the molar ratio of 1,9-nonanediamine units based on 2-methyl-1,8-octanediamine units to be between preferably 99/1 and 1/99, more preferably 95/5 to 60/40, and still more preferably 90/10 to 80/20. If a polyamide resin containing 1,9-nonanediamine units and 2-methyl-1,8-octanediamine units in the above proportions is used, the polyamide resin composition will have better heat resistance and moldability, lower water absorption, and give molded articles having more excellent surface appearance.

The diamine units (b) may also contain not more than 50 mol % of other diamine units besides aliphatic alkylenediamine units having 6 to 18 carbon atoms. Examples of these other diamine units include units derived from aliphatic diamines such as ethylenediamine, propanediamine and 1,4-butanediamine; alicyclic diamines such as cyclohexanediamine, methylcyclohexanediamine, isophoronediamine, norbornanedimethylamine and tricyclodecanedimethylamine; and aromatic diamines such as p-phenylenediamine, m-phenylenediamine, p-xylylenediamine, m-xylylenediamine, 4,4'-diaminodiphenylmethane, 4,4'-diaminodiphenyl sulfone and 4,4'-diaminodiphenyl ether. These can be used singly or in combinations of two or more types. The content of these other diamine units in the diamine units (b) is preferably not more than 40 mol %, more preferably not more than 25 mol %, and still more preferably not more than 10 mol %.

The above-mentioned semi-aromatic polyamide or other such polyamide resin of component (A) preferably has at least 10% of the terminal groups of its molecular chains blocked with a terminal blocking agent. The proportion in which the terminal groups of the molecular chains are blocked (terminal blocking ratio) is preferably at least 40%, more preferably 70% or higher. A polyamide resin with a terminal blocking ratio of at least 10% gives a polyamide resin composition with superior melt moldability, and the surface appearance and other such properties of the molded article obtained from this composition will also be superior.

The terminal blocking ratio here can be determined by measuring the numbers of terminal carboxyl groups, terminal amino groups, and terminal groups blocked with the terminal blocking agent present in the polyamide resin, and calculating from the equation (1) given below. In terms of both precision and simplicity, it is preferable to find the number of the terminal groups on the basis of the integral value of the characteristic signals corresponding to the various terminal groups using $^1$H-NMR.

In the equation (1), X is the total number of terminal groups in the molecular chains (this is usually equal to two times the number of polyamide molecules), and Y is the total number of both the terminal carboxyl groups and the terminal amino groups remaining unblocked.

Terminal blocking ratio (%)=[(X−Y)/X]×100    (1)

There are no particular restrictions on the terminal blocking agent, as long as it is a monofunctional compound that is reactive with the carboxyl groups or amino groups of the polyamide terminals. However, from the standpoints of reactivity and the stability of the blocked terminals, for example, a monocarboxylic acid is preferable. In addition, acid anhydrides, monoisocyanates, mono-acid halides, monoesters, and monoalcohols can also be used.

There are no particular restrictions on the monocarboxylic acid used as a terminal blocking agent, as long as it is reactive with amino groups. Examples of the monocarboxylic acid include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid; and mixtures of any of the above. Of these, acetic acid, propionic acid, butyric acid, valeric acid, caproic acid, caprylic acid, lauric acid, tridecanoic acid, myristic acid, palmitic acid, stearic acid, and benzoic acid are preferred because of their reactivity, stability of the blocked terminal, and low cost.

There are no particular restrictions on the monoamine used as the terminal blocking agent, as long as it is reactive with carboxyl groups. Examples of the monoamine include aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic monoamines such as aniline, toluidine, diphenylamine and naphthylamine; and mixtures of any of the above. Of these, butylamine, hexylamine, octylamine, decylamine, stearylamine, cyclohexylamine and aniline are preferred because of their reactivity, high boiling point, stability of the blocked terminal, and low cost.

The above-mentioned semi-aromatic polyamide or other such polyamide resin of component (A) can be manufactured by any known method for producing crystalline polyamides. For instance, it can be manufactured by solution polymerization or interfacial polymerization in which acid chloride and diamine are used as the raw materials, or by melt polymerization, solid-phase polymerization, or melt extrusion polymerization in which dicarboxylic acid and diamine are used as the raw materials.

In a specific example of a method for manufacturing the polyamide resin of component (A), a dicarboxylic acid component which constitutes the dicarboxylic acid units (a), a diamine component which constitutes the diamine units (b), a catalyst, and, if needed, a terminal blocking agent are added to a reaction vessel all at once to give a nylon salt, which is then heated and polymerized at 200 to 250° C. to give a prepolymer having an intrinsic viscosity [η], measured in 30° C. concentrated sulfuric acid, of 0.1 to 0.6 dL/g, and this prepolymer is then further polymerized in the solid phase or with a melt extruder. If the intrinsic viscosity [η] of the prepolymer is between 0.1 and 0.6 dL/g, there will be very little decrease in polymerization rate or loss of molar balance between carboxyl groups and amino groups in the subsequent polymerization step, and the resulting polyamide resin will have a narrower molecular weight distribution, better physical properties, and better moldability.

If the final step of polymerization is carried out in the solid phase, it is preferred to conduct it under reduced pressure or in an inert gas atmosphere, and if the polymerization temperature is kept between 200 and 280° C., the polymerization rate will be higher, productivity will be better, and coloration and gelling will be effectively suppressed. If the final step of the polymerization is carried out with a melt extruder, the polymerization temperature is preferably 370° C. or lower. Polymerizing under these conditions results in substantially no decomposition of the polyamide resin, and gives a polyamide resin with no degradation.

Phosphoric acid, phosphorous acid, hypophosphorous acid, and salts and esters thereof can be added as a catalyst, for example, in addition to the above-mentioned terminal blocking agent in the manufacture of the polyamide resin of component (A). Examples of the above-mentioned salts and esters include salts of phosphoric acid, phosphorous acid, or hypophosphorous acid with a metal such as potassium, sodium, magnesium, vanadium, calcium, zinc, cobalt, manganese, tin, tungsten, germanium, titanium, or antimony; ammonium salts of phosphoric acid, phosphorous acid, or hypophosphorous acid; and ethyl esters, isopropyl esters, butyl esters, hexyl esters, isodecyl esters, octadecyl esters, decyl esters, stearyl esters, and phenyl esters of phosphoric acid, phosphorous acid, or hypophosphorous acid.

The intrinsic viscosity [η] of the polyamide resin of component (A) is preferably between 0.4 and 3.0 dL/g, more preferably between 0.5 and 2.0 dL/g, and still more preferably between 0.6 and 1.5 dL/g, as measured in concentrated sulfuric acid at 30° C. A polyamide resin with an intrinsic viscosity [η] within the above range gives a polyamide resin composition that provides molded articles with superior dynamic characteristics, heat resistance, and so forth.

The ester compound of component (B) which constitutes the polyamide resin composition and imparts excellent flowability to the polyamide resin composition of the present invention along with the bromine-based flame retardant of component (C) discussed below is a compound represented by Formula (I) below:

(I)

where $R^1$ and $R^2$ are alkyl groups having at least 9 carbon atoms, and m and n are integers from 1 to 3.

The ester compound of component (B) represented by Formula (I) can be obtained, for example, by adding ethylene oxide to bisphenol A to give a compound represented by the following Formula (II):

(II)

and then reacting this compound with a saturated fatty acid having 10 or more of carbon atoms. The reaction ratio of the saturated fatty acid with respect to the hydroxy groups of the compound represented by Formula (II) is preferably at least 50%, and more preferably at least 70%. The flowability of the polyamide resin composition will be higher if the reaction ratio is within this range.

$R^1$ and $R^2$ in Formula (I) are alkyl groups having at least 9 carbon atoms. $R^1$ and $R^2$ may be the same or different. $R^1$ and $R^2$ are usually residues obtained by removing the carboxyl group from a saturated fatty acid represented by $R^1COOH$ or $R^2COOH$, and for $R^1$ and $R^2$ to meet the above conditions, a saturated fatty acid having 10 or more of carbon atoms can be used as the raw material in the manufacture of the compound represented by Formula (I). $R^1$ and $R^2$ correspond to the saturated fatty acid used. Examples of this saturated fatty acid include decanoic acid (capric acid), undecanoic acid, dodecanoic acid (lauric acid), tridecanoic acid, tetradecanoic acid (myristic acid), pentadecanoic acid, hexadecanoic acid (palmitic acid), heptadecanoic acid, octadecanoic acid (stearic acid), eicosanoic acid (arachic acid), docosanoic acid (behenic acid), tetracosanoic acid (lignoceric acid), hexacosanoic acid (cerotic acid), octacosanoic acid (montanoic acid), and triacontanoic acid (melissic acid). These saturated fatty acids may be used singly or in mixtures of two or more types. Of these, a saturated fatty acid having 16 to 26 carbon atoms is preferable in terms of the heat resistance, flowability, and productivity of the polyamide resin composition of the present invention, and a saturated fatty acid having 18 to 24 carbon atoms is especially favorable.

m and n in Formula (I) are integers from 1 to 3. If either m or n is an integer of 4 or more, there may be a decrease in the heat resistance, flowability, and so forth of the polyamide resin composition of the present invention. m and n may be the same or different.

The content of the compound of component (B) represented by Formula (I) is 0.2 to 20 parts by weight, and preferably 0.5 to 10 parts by weight, per 100 parts by weight of the polyamide resin of component (A). If the content of the compound of component (B) is less than 0.2 part by weight part per 100 parts by weight of the polyamide resin of component (A), it will have little effect of increasing the flowability of the resulting polyamide resin composition. On the other hand, if the content is higher than 20 parts by weight, there will be a decrease in blistering resistance, mechanical strength, and flame retardance in the resulting polyamide resin composition.

Examples of the bromine-based flame retardant of component (C) include brominated polystyrene, polybromostyrene, brominated polyphenylene ether, brominated bisphenol-type epoxy-based polymers, brominated styrene maleic anhydride polymers, brominated epoxy resins, brominated phenoxy resins, decabromodiphenyl ether, decabromobiphenyl, brominated polycarbonate, perbromocyclopentadecane, and brominated cross-linked aromatic polymers, all of which can be used singly or in combinations of two or more types. Of these, polybromostyrene and brominated polyphenylene ether are preferred.

Using a bromine-based flame retardant that has been modified with an acid anhydride group, epoxy group, or the like is especially favorable in terms of improving miscibility with polyamides. A specific example of such a compound is "CN2044C" made by Great Lakes Chemical Co., Ltd.

It is preferable for the bromine atom content in the bromine-based flame retardant of component (C) to be between 15 and 87 wt %.

The content of the bromine-based flame retardant of component (C) is 1 to 100 parts by weight, and preferably 10 to 75 parts by weight, per 100 parts by weight of the polyamide resin of component (A). If the content of the bromine-based flame retardant of component (C) is less than 1 part by weight per 100 parts by weight of the polyamide resin of component (A), there will be a decrease in the flowability and the flame retardance of the resulting polyamide resin composition. On the other hand, if the content of the bromine-based flame retardant of component (C) is higher than 100 parts by weight parts per 100 parts by weight of the polyamide resin of component (A), the dynamic characteristics of the resulting polyamide resin composition may be reduced.

The polyamide resin composition of the present invention may further contain an amide compound (D) having a molecular weight of 300 and 3000 and a melting point of 80 to 260° C. Using this amide compound (D) provides a polyamide composition with better flowability. The content of the amide compound (D) is preferably 0.1 to 10 parts by weight, and more preferably 0.5 to 5 parts by weight, and still more preferably 1 to 5 parts by weight, per 100 parts by weight of the polyamide resin of component (A).

The molecular weight of the amide compound (D) must be between 300 and 3000. If the molecular weight of the amide compound (D) is less than 300, decomposition of the bromine-based flame retardant (C) or the polyamide resin of component (A) may be promoted during preparation or molding of the polyamide resin composition, and the decomposition gas that is generated may cause corrosion of metal mold, create bubbles in the molded article, and so forth. Other problems that may occur are a decrease in the flame retardance of the resulting polyamide composition, and bleed-out of the amide compound (D) therefrom. On the other hand, the molecular weight of the amide compound (D) is higher than 3000, the flowability of the resulting polyamide composition may be reduced.

The amide compound (D) should have a melting point of 80 to 260° C. If the melting point thereof is less than 80° C., decomposition of the bromine-based flame retardant (C) or the polyamide resin of component (A) may be promoted during preparation or molding of the polyamide resin composition, and the decomposition of gas generated may cause corrosion of metal mold and create bubbles in the molded articles. In addition, flame retardance of the polyamide resin composition may be reduced.

If the melting point thereof is higher than 260° C., the flame retardance of the polyamide resin composition may be reduced.

From the standpoint of heat resistance, it is preferable for the amide compound (D) to have a midpoint temperature of at least 350° C. on a thermogravimetric analysis curve measured in a nitrogen atmosphere. Mass changes in multiple stages are sometimes observed in thermogravimetric measurement. In this case, the primary midpoint temperature, which is the lowest midpoint temperature, is employed as the midpoint temperature in the present invention.

The amide compound (D) includes amide oligomers, fatty acid amides, bisamides of aliphatic dicarboxylic acids, aromatic carboxylic acid amides, bisamides of aromatic dicarboxylic acids, and bisamides of aliphatic diamines. Among them, preferred are amide compounds obtained by a reaction between a diamine and a mixture of a monocarboxylic acid and a dicarboxylic acid.

The amide compound (D) can be manufactured using a monocarboxylic acid, a divalent or higher valent polyfunctionalized carboxylic acid, a monoamine, a divalent or higher valent polyfunctionalized amine, or the like as the raw materials. The amide compound (D) can be manufactured by using the known reaction as discussed in Japanese Patent Application Laid-Open No. Hei5-194841 and other such publications. For instance, the desired amide compound (D) can be obtained by charging specific amounts of dicarboxylic acid and monocarboxylic acid into a reaction vessel under a nitrogen atmosphere, adding a diamine thereto, and then raising the temperature to the point at which amidation will proceed, allowing the reaction to continue while removing the water produced by the reaction, and terminating the reaction at the point when water is no longer distilled off.

Specific examples of the monocarboxylic acid that constitutes the amide compound (D) are the same as those given for the monocarboxylic acid used as the terminal blocking agent in the manufacture of the polyamide resin of component (A). Among them, preferred are stearic acid, palmitic acid and benzoic acid in terms of the thermal stability of the amide compound (D), and in terms of the flowability and productivity of the resulting polyamide resin composition.

Examples of the divalent or higher valent polyfunctionalized carboxylic acid that constitutes the amide compound (D) include aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid, suberic acid and dodecanedioic acid; alicyclic dicarboxylic acids such as 1,3-cyclopentanedicarboxylic acid and 1,4-cyclohexanedicarboxylic acid; aromatic dicarboxylic acids such as isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxy-diacetic acid, diphenic acid, 4,4'-oxydibenzoic acid, diphenylmethane-4,4'-dicarboxylic acid, diphenylsulfone-4,4'-dicarboxylic acid and 4,4'-biphenyldicarboxylic acid; and polyfunctionalized carboxylic acids such as trimellitic acid, trimesic acid and pyromellitic acid. These can be used singly or in combinations of two or more types. Among them, preferred are adipic acid, azelaic acid, sebacic acid, dodecanedicarboxylic acid and terephthalic acid from the standpoint of the thermal stability of the amide compound (D), and from the standpoint of the flowability and productivity of the resulting polyamide composition.

Specific examples of the monoamine that constitutes the compound (D) are the same as those given for the monoamine used as the terminal blocking agent in the manufacture of the polyamide resin of component (A). Examples of the divalent or higher valent polyfunctionalized amine that constitutes the amide compound (D) include aliphatic diamines such as ethylenediamine, propanediamine, 1,4-butanediamine, 1,6-hexanediamine, 1,9-nonanediamine, 1,10-decanediamine, 1,12-dodecanediamine, 2-methyl-1,8-octanediamine, 2-methyl-1,5-pentanediamine, 2,2,4-trimethyl-1,6-hexanediamine and 2,4,4-trimethyl-1,6-hexanediamine; alicyclic diamines such as cyclohexanediamine, methylcyclohexanediamine, isophoronediamine, norbornanedimethylamine and tricyclodecanedimethylamine; and aromatic diamines such as p-phenylenediamine, m-phenylenediamine, p-xylylenediamine, m-xylylenediamine, 4,4'-diaminodiphenylmethane, 4,4'-diaminodiphenylsulfone and 4,4'-diaminodiphenyl ether. These can be used singly or in combinations of two or more types. Among them, preferred are ethylenediamine, 1,6-hexanediamine, 1,9-nonanediamine, 2-methyl-1,8-octanediamine and m-xylylenediamine from the standpoint of the thermal stability of the compound (D), and from the standpoint of the flowability and productivity of the resulting polyamide composition.

The flame retardant synergist of component (E) and the filler of component (F) can also be added as needed in the polyamide resin composition of the present invention.

Examples of the flame retardant synergist of component (E) include antimony trioxide, antimony pentoxide, sodium antimonate, sodium oxide, tin oxide, zinc stannate, zinc oxide, iron oxide, magnesium hydroxide, calcium hydroxide, zinc borate, kaolin, clay, and calcium carbonate. These can be used singly or in combinations of two or more types. The flame retardant synergist of component (E) may also be treated with a silane coupler, titanium coupler, or the like. Of these, preferred is zinc stannate, sodium antimonate, or zinc borate. The content of the flame retardant synergist of component (E) is preferably 0.1 to 50 parts by weight, and more preferably 1 to 30 parts by weight, per 100 parts by weight of the polyamide resin of component (A). Adding these flame retardant synergist provides a polyamide resin composition with superior flame retardance.

The filler of component (F) can be in the form of fibers, a powder, a cloth, or any other form.

Examples of fibrous fillers include organic fibrous fillers such as wholly aromatic polyamide fibers of polyparaphenylene terephthalamide fibers, polymetaphenylene terephthalamide fibers, polyparaphenylene isophthalamide fibers, polymetaphenylene isophthalamide fibers or fibers obtained from a condensate of diaminodiphenyl ether and terephthalic or isophthalic acid and wholly aromatic liquid crystal polyester fibers; and inorganic fibrous fillers such as glass fibers, carbon fibers and boron fibers. Of these, glass fibers are preferable in terms of mechanical strength, productivity, and electrical characteristics of the molded articles obtained from the polyamide resin composition.

When glass fibers are used as the fibrous filler, their cross sectional shape may be round, cocoon-shaped, or flat. Specific examples include "CS-3J-256S", which are fibers with a round cross section made by Nitto Boseki Co., Ltd., and "CSH-3PA-870S", which are fibers with a cocoon-shaped cross section made by Nitto Boseki Co., Ltd. Glass fibers with cocoon-shaped or flat cross section is preferable because it can provide less curling and better flowability with the resulting polyamide resin composition. Such a fibrous filler can not only improve the mechanical strength of a molded article obtained from the polyamide resin composition, but also improve the dimensional stability and reduce water absorption, and so on. The average length of the above-mentioned fibrous filler is preferably within a range of from 0.05 to 50 mm, and from the standpoint of improving the moldability of the polyamide resin composition and improving the heat resistance and mechanical strength of the molded article obtained from this polyamide resin composition, more preferably within a range of 1 to 10 mm. This fibrous fillers may also be formulated into a cloth by secondary processing.

Examples of powdered fillers include silica, silica-alumina, alumina, titanium oxide, zinc oxide, boron nitride, talc, mica, potassium titanate, calcium silicate, magnesium sulfate, aluminum borate, asbestos, glass beads, carbon black, graphite, molybdenum disulfide, and polytetrafluoroethylene. The powdered filler has an average particle size of preferably 0.1 to 200 μm, and more preferably 1 to 100 μm. Such a powdered filler improves the dimension stability, mechanical properties, heat resistance, chemical and physical properties, sliding properties, and so forth of the molded article obtained from the polyamide resin composition.

The above-mentioned fillers of component (F) can be used singly or in combinations of two or more types. The content of the filler of component (F) is preferably 0.1 to 300 parts by weight, more preferably 0.1 to 150 parts by weight, and still more preferably 0.5 to 100 parts by weight, per 100 parts by weight of the polyamide resin of component (A). Keeping the filler content within the above range gives a polyamide resin composition with excellent moldability and dynamic characteristics. In order to improve its dispersibility in a polyamide resin, the filler is preferably surface-treated with a silane coupler, titanium coupler, or other high- or low-molecular weight surface treating agent.

If needed, the polyamide resin composition of the present invention may contain an acid catcher such as hydrotalcite; other types of polymer such as polyphenylene sulfides, polyolefins, polyesters, aliphatic polyamides, polyphenylene oxides, and liquid crystal polymers; colorants; UV absorbents; light stabilizers; antioxidants based on hindered phenols, organosulfur compounds, phosphorus compounds, amines, or the like; antistatic agents; nucleating agents; plasticizers; mold release; lubricants; and so forth.

The polyamide resin composition of the present invention can be manufactured by blending the polyamide resin of component (A) with the compound represented by Formula (I) of component (B) and the bromine-based flame retardant of component (C), and if needed, with the amide compound (D), the flame retardant synergist of component (E), the filler of component (F), and any of the above-mentioned additives. Examples of this blending methods include a method in which the compound represented by Formula (I) and the other components are added during the polycondensation of the polyamide resin of component (A), a method in which the polyamide resin of component (A), the compound represented by Formula (I) and the other components are dry-blended, or melt-kneaded with an extruder. Of these, a method in which melt kneading with an extruder is usually preferred because the operation is easier. The extruder used for this purpose is preferably a twin-screw type, and the melt kneading temperature is preferably between 280 and 340° C.

The polyamide resin composition of the present invention can be formulated into molded articles of various shapes by any molding method commonly used in the molding of thermoplastic resin compositions, such as injection molding, extrusion molding, press molding, blow molding, calender molding, or casting. For example, a molded article of the desired shape can be manufactured by melting the polyamide resin composition of the present invention in the cylinder of an injection molding machine, a cylinder temperature of which is set between the melting point of the polyamide resin and 350° C., and then injecting this melt into a mold of the required shape. A fibrous article can be manufactured by melting the polyamide resin composition of the present invention with an extruder, the cylinder temperature of which is set within the above range, and spinning the melt from a spinneret. A film or sheet can be manufactured by melting the polyamide resin composition of the present invention with an extruder, the cylinder temperature of which is set within the above range, and extruding the melt from a T-die. The surface of the molded articles manufactured by these methods may be applied a coating composed of a paint, a metal, or another type of polymer.

Because of its excellent flowability, mechanical strength, sliding properties, and blistering resistance, the polyamide resin composition of the present invention can be used in a variety of fields, such as electrical and electronic devices, automobiles parts, household electrical products, construction materials, sanitary goods, sports goods, and sundries. Specific examples include connectors, switches, sensors, sockets, capacitors, jacks, fuse holders, relays, coil bobbins, resistors, IC and LED housings, gears, bearing retainers, spring holders, chain tensioners, washers, various other housings, weight rollers, breaker parts, and clutch parts. Of these, the polyamide resin composition of the present invention is particularly useful for IC and LED housings, coil bobbins, resistors, fuse holders, relays, capacitor seats, sensors, switches, power supply parts, jacks, card connectors, sockets, and connectors used in surface mount applications.

EXAMPLES

The present invention will now be described in specific terms through examples, but is not limited in any way by these examples. The flowability of the polyamide resin composition and the mechanical strength, blistering resistance, sliding properties, and flame retardance of the molded article in these examples were evaluated by the following methods. The evaluation results are given in Tables 1 and 2.

Flowability

The flow length was measured when a polyamide resin composition was injected into a sheet of 0.5 mm in thickness at a cylinder temperature of 320° C., an injection pressure of 750 kgf, and a mold temperature of 140° C. The higher the value, the better the flowability of the material. With the LCP, though, the flow length was measured at a cylinder temperature of 340° C.

Mechanical Strength

The polyamide resin composition was molded into a specific shape and size, and the molded article (test piece) thus obtained was measured for tensile strength and weld strength as set forth in ASTM D638.

Siding Properties

An injection molded article (test piece) of 10 cm in length, 4 cm in width, and 1 mm in thickness was produced from the polyamide resin composition, and allowed to stand for 48 hours at 23° C. in an absolute dry atomosphere. After this, a metal needle with a conical tip of a diameter of 3 mm, made of S45C steel, carrying a weight of 500 g was set up on the test piece and moved for 5 cm in length. The depth of the resulting gouge was measured with a surface roughness meter. The shallower the gouge, the better the sliding properties. In Tables 1 and 2, "good" means the gouge depth was less than 10 μm, "fair" means at least 10 μm and less than 20 μm, and "poor" means at least 20 μm.

Blistering Resistance

Figure 1:
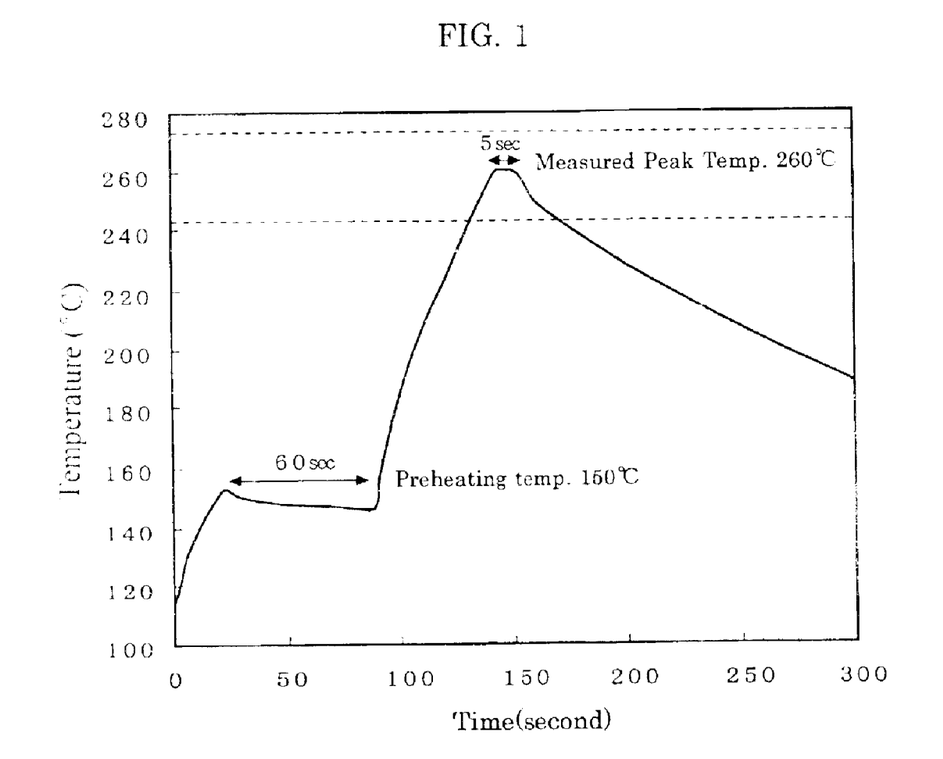
FIG. 1 is a graph of the temperature profile (when the measured peak temperature (variable) is 260° C.) for a test piece in an infrared heating oven.

A sheet (test piece) of 0.5 mm in thickness, 10 mm in width, and 30 mm in length was produced by injection molding of the polyamide resin composition, and left for 72 hours at a temperature of 40° C. and a relative humidity of 95% to adjust its moisture content. After this, the test piece was subjected to reflow step of the thermal profile shown in FIG. 1 using an infrared heating oven ("SMT Scope", made by Sanyo Seiko). The thermal profile was monitored by a sensor equipped on the test piece. The reflow step was conducted by changing the actual peak temperature, as described in FIG. 1, from 240° C. to 270° C. at intervals of 5° C. The appearance of the test piece was observed visually after it had passed through the infrared heating oven. The highest temperature at which the test piece did not melt and no blistering occurred was recorded as the blistering resistance temperature. The higher the blistering resistance temperature, the better the blistering resistance. In Tables 1 and 2, "poor" means the blistering resistance temperature was lower than 240° C., "fair" means the blistering resistance temperature was between 240 and 250° C., and "good" means the blistering resistance temperature was higher than 250° C.

Flame Retardance

A sheet (test piece) of 1 mm in thickness was produced by injection molding of the polyamide resin composition, and tested for the flame retardance thereof as set forth in UL-94, as discussed below. A test piece of a thickness of 1 mm is vertically clamped at its top end, a specific flame is applied to the bottom end for 10 seconds and then removed, and the time for which the test piece is still burning is measured (first test). After the test piece is spontaneously extinguished, a flame is again applied to the bottom end of test piece and removed, and the time for which the test piece is still burning is measured (second test). The same measurement is made for five test pieces, and a total of ten measurements is made. Thus, five data for the burning time in the first test and five data for the burning time in the second test are obtained. The total of these ten measurement values is termed T, and the maximum value thereof was termed M. A rating of "V-0" is given if T is 50 seconds or less, M is 10 seconds or less, the test piece does not burn all the way up to the clamp, and no flaming molten drops ignited a cotton cloth 12 inches below the test piece. A rating of "V-1" is given if T is 250 seconds or less, M is 30 seconds or less, the test piece does not burn all the way up to the clamp, and the other condition is satisfied the same as for the "V-0" rating. A rating of "V-2" is given if T is 250 seconds or less, M is 30 seconds or less, the test piece does not burn all the way up to the clamp, and flaming molten drops did ignite a cotton cloth 12 inches below the test piece.

The following species were employed as the polyamide resin, etc., in the following Examples and Comparative Examples.

[Component (A)]

PA9MT

A polyamide with an intrinsic viscosity [η] of 0.80 dL/g, a melting point of 308° C., and a terminal blocking ratio of 90% (terminal blocking agent: benzoic acid), prepared according to the method described in Example 1 of Japanese Patent Application Laid-Open No. Hei9-12713, in which the dicarboxylic acid units were terephthalic acid units, and the diamine units consisted of 85 mol % of 1,9-nonanediamine units and 15 mol % of 2-methyl-1,8-octanediamine units.

PA6-6T

A polyamide with an intrinsic viscosity [η] of 0.82 dL/g, a melting point of 310° C., and a terminal blocking ratio of 89% (terminal blocking agent: benzoic acid), prepared according to the method described in Example 1 of Japanese Patent Application Laid-Open No. 2000-86759, in which the dicarboxylic acid units consisted of 55 mol % of terephthalic acid units and 45 mol % of adipic acid units and the diamine units were 1,6-hexanediamine units.

PA46

A commercially available product with a melting point of 292° C., ("Nylon F5000", made by Unitika Ltd.).

[Component (B)]

Ester Compound 1

A compound represented by Formula (I), in which $R^1$ and $R^2$ are henicosyl groups, and m and n are 1.

Ester Compound 2

A compound represented by Formula I, in which $R^1$ and $R^2$ are heptadecyl groups, and m and n are 2.

[Component (C)]

GMA-PBrS

A brominated polystyrene modified with 2.0 mol % of glycidyl methacrylate ("CN2044C", made by Great Lakes Chemical Ltd.).

Brominated PPO

A brominated polypropylene oxide ("SR-460B", made by Dai-ichi Kogyo Seiyaku Co., Ltd.).

[Component (D)]

AM-1

An amide oligomer with a molecular weight of 790 (determined by GPC analysis), a melting point of 204° C. and a midpoint temperature of 380° C. on a thermogravimetric analysis curve measured in a nitrogen atmosphere, manufactured using stearic acid, ethylenediamine, and adipic acid, obtained in Reference Example 1 below.

[Reference Example 1]

A four-neck flask equipped with a nitrogen inlet, a distillation port, and a dropping funnel was charged with 691.4 g (2.32 mol) of stearic acid and 169.4 g (1.16 mol) of adipic acid under a nitrogen atmosphere. The contents were heated to 190° C. and completely melted, after which 139.2 g (2.32 mol) of ethylenediamine was added through the dropping funnel over a period of about 30 minutes. After all the ethylenediamine had been added, the reaction mixture was heated to 230° C., and the reaction was stopped at the time when 83.5 g (4.64 mol) of the water produced by the reaction had been distilled off. The reaction mixture was cooled to room temperature, taken out from the flask and finely pulverized into a powder. The midpoint temperature on a thermogravimetric analysis curve was determined by the following method.

Midpoint Temperature on a Thermogravimetric Analysis Curve

This was determined as set forth in JIS K 7120. Specifically, 10 mg of sample was placed on a specific thermal balance, the change in mass of the sample was observed when it was heated from room temperature at a rate of temperature rise of 10° C./min under a nitrogen flow having a rate of 100 mL/min, and the midpoint temperature was read from the resulting curve of change in mass.

AM-2

A bisamide with a molecular weight of 690, a melting point of 125° C. and a midpoint temperature of 390° C. on a thermogravimetric analysis curve measured in a nitrogen atmosphere, manufactured using stearic acid and 1,9-nonanediamine. This was obtained by the same procedures as in Reference Example 1, except that no adipic acid was used, and 183.6 g (1.16 mol) of 1,9-nonanediamine was used instead of the 139.2 g (2.32 mol) of ethylenediamine.

[Component (E)]

Zinc Borate

"Fire Break 415", made by Borax Kabushiki Kaisha.

Zinc Stannate

"Flamtard-S", made by Nippon Light Metal Company, Ltd.

Sodium Antimonate

"NA-1070L", made by Nissan Chemical Industries Ltd.

[Component (F)]

Glass Fiber 1

"CS-3J-256S" (round cross section), made by Nitto Boseki Co., Ltd.

Glass Fiber 2

"CSH-3PA-870S" (cocoon-shaped cross section), made by Nitto Boseki Co., Ltd.

PTFE

"PTFE-6J" (micropowder of polytetrafluoroethylene), made by Du pont-Mitsui Fluorochemicals Company Ltd.

Examples 1 to 9

The components listed in Table 1 below were premixed in an amount shown in Table 1, then fed into a twin-screw extruder ("TEX44C", made by The Japan Steel Works Ltd.), where the mixture was melt-kneaded and extruded at a cylinder temperature of 320° C., then cooled and cut into pellets of polyamide resin composition. The flowability of the resulting polyamide resin composition was evaluated by the method given above. Also, a molded article obtained by the injection molding of the polyamide resin composition at the condition of cylinder temperature of 330° C. and mold temperature of 150° C. was tested for mechanical strength, sliding properties, blistering resistance, and flame retardance by the above methods. These results are given in Table 1.

Comparative Example 1

Pellets of a polyamide resin composition were obtained by the same procedures as in Example 1, except that the ester compound 1 was not added. The resulting polyamide resin composition was tested in the same manner as in Example 1, the results of which are given in Table 2.

Comparative Example 2

Pellets of a polyamide resin composition were obtained by the same procedures as in Example 1, except that the ester compound 1, the GMA-PBrS, and the zinc stannate were not added. The resulting polyamide resin composition was tested in the same manner as in Example 1, the results of which are given in Table 2.

Comparative Example 3

Pellets of a polyamide resin composition were obtained by the same procesures as in Example 1, except that the GMA-PBrS and the zinc stannate were not added. The resulting polyamide resin composition was tested in the same manner as in Example 1, the results of which are given in Table 2.

Comparative Example 4

Pellets of a polyamide resin composition were obtained by the same procedures as in Example 1, except that the ester compound 1 was added to PA9MT in an amount shown in Table 2. The resulting polyamide resin composition was tested in the same manner as in Example 1, the results of which are given in Table 2.

Comparative Examples 5 and 6

Molded articles obtained by the injection molding of an LCP ("Sumika Super E6006L", made by Sumitomo Chemical Company Ltd.) or PPS ("Fortron A4", made by Poly-

TABLE 1

|  | Examples | | | | | | | | |
|---|---|---|---|---|---|---|---|---|---|
|  | 1 | 2 | 3 | 4 | 5 | 6 | 7 | 8 | 9 |
| Composition [parts by weight] | | | | | | | | | |
| PA9MT | 36.1 | 33.25 | 35.15 | 36.1 | 36.1 | — | — | 36.1 | 36.1 |
| PA6-6T | — | — | — | — | — | 35.15 | — | — | — |
| PA46 | — | — | — | — | — | — | 35.15 | — | — |
| Ester Compound 1 | 1.9 | 1.75 | 1.85 | 1.9 | — | 1.85 | 1.85 | 0.95 | 0.95 |
| Ester Compound 2 | — | — | — | — | 1.9 | — | — | — | — |
| GMA-PBrS | 23 | 26 | — | 23 | 23 | 23 | 23 | 23 | 23 |
| Brominated PPO | — | — | 23 | — | — | — | — | — | — |
| AM-1 | — | — | — | — | — | — | — | 0.95 | — |
| AM-2 | — | — | — | — | — | — | — | — | 0.95 |
| Zinc Stannate | 5 | — | 1 | 5 | 5 | 1 | 1 | 5 | 5 |
| Zinc Borate | — | 5 | — | — | — | — | — | — | — |
| Sodium Antimonate | — | — | 5 | — | — | 5 | 5 | — | — |
| Glass Fiber 1 | 33 | 33 | 33 | — | 33 | 33 | 33 | 33 | 33 |
| Glass Fiber 2 | — | — | — | 33 | — | — | — | — | — |
| PTFE | 1 | 1 | 1 | 1 | 1 | 1 | 1 | 1 | 1 |
| Properties | | | | | | | | | |
| Flowability [mm] | 90 | 93 | 88 | 95 | 91 | 89 | 87 | 94 | 93 |
| Tensile strength [MPa] | 170 | 165 | 168 | 160 | 169 | 165 | 160 | 166 | 167 |
| Weld strength [MPa] | 35 | 32 | 33 | 35 | 34 | 32 | 33 | 33 | 33 |
| Sliding property | good | good | good | good | good | fair | poor | good | good |
| Blistering resistance | good | good | good | good | good | fair | poor | good | good |
| Flame retardance | V-0 | V-0 | V-0 | V-0 | V-0 | V-0 | V-0 | V-0 | V-0 | plastics Co., Ltd.), both of which are resins with high heat resistance, were tested by the above methods, the results of which are given in Table 2. Table 2 also shows the results of evaluating the flowability of these resins by the above method.

TABLE 2

|  | Comparative Examples | | | | | |
| --- | --- | --- | --- | --- | --- | --- |
|  | 1 | 2 | 3 | 4 | 5 | 6 |
| Composition (parts by weight) | | | | | | |
| PA9MT | 38 | 66 | 62.7 | 28.5 | — | — |
| LCP | — | — | — | — | 100 | — |
| PPS | — | — | — | — | — | 100 |
| Ester Compound 1 | — | — | 3.3 | 9.5 | — | — |
| GMA-PBrS | 23 | — | — | 23 | — | — |
| Zinc Stannate | 5 | — | — | 5 | — | — |
| Glass Fiber 1 | 33 | 33 | 33 | 33 | — | — |
| PTFE | 1 | 1 | 1 | 1 | — | — |
| Properties | | | | | | |
| Flowability [mm] | 62 | 45 | 50 | 105 | 90 | 35 |
| Tensile strength [MPa] | 175 | 190 | 185 | 150 | 140 | 175 |
| Weld strength [MPa] | 38 | 60 | 57 | 28 | 20 | 50 |
| Sliding property | good | good | good | good | poor | fair |
| Blistering resistance | good | good | good | poor | good | good |
| Flame retardance | V-0 | V-1 | V-1 | V-2 | V-0 | V-0 |

Having now fully described the invention, it will be apparent to one of the ordinary skill in the art that many changes and modifications can be made thereto without departing from the spirit or scope of the invention as set forth herein.

This application is based on Japanese Patent Application No. 2002-112344, filed on Apr. 15, 2002, the entire contents of which are hereby incorporated by reference.

What is claimed is:

1. A polyamide resin composition comprising
   100 parts by weight of (A) a polyamide resin with a melting point of 270° C. to 340° C.;
   0.2 to 20 parts by weight of (B) a compound represented by Formula (I)

(I)

where $R^1$ and $R^2$ are alkyl groups having at least 9 carbon atoms, and m and n are integers from 1 to 3; and
   1 to 100 parts by weight of (C) a bromine-based flame retardant.

2. The polyamide resin composition according to claim 1, further comprising an amide compound (D) with a molecular weight of 300 to 3000 and with a melting point of 80 to 260° C., in an amount of 0.1 to 10 parts by weight per 100 parts by weight of the polyamide resin of component (A).

3. The polyamide resin composition according to claim 2, wherein the amide compound (D) is obtained by reacting a diamine with a mixture of a monocarboxylic acid and a dicarboxylic acid.

4. The polyamide resin composition according to claim 1, wherein the polyamide resin of component (A) comprises reacted units of (a) dicarboxylic acid units containing 50 to 100 mol % of terephthalic acid units and (b) diamine units containing 50 to 100 mol % of aliphatic alkylenediamine units having 6 to 18 carbon atoms.

5. The polyamide resin composition according to claim 4, wherein the aliphatic alkylenediamine units having 6 to 18 carbon atoms are at least one of 1,9-nonanediamine units or 2-methyl-1,8-octanediamine units.

6. The polyamide resin composition according to claim 1, wherein the polyamide resin of component (A) has an intrinsic viscosity of 0.4 to 3.0 dL/g.

7. The polyamide resin composition according to claim 1, further comprising a flame retardant synergist of component (E), in an amount of 0.1 to 50 parts by weight per 100 parts by weight of the polyamide resin of component (A).

8. The polyamide resin composition according to claim 1, further comprising a filler of component (F), in an amount of 0.1 to 300 parts by weight per 100 parts by weight of the polyamide resin of component (A).

9. A molded article comprising the polyamide resin composition according to claim 1.

10. The polyamide resin composition according to claim 1, wherein (C) is at least one selected from the group consisting of brominated polystyrene, polybromostyrene, brominated polyphenylene ether, brominated bisphenol epoxy polymer, brominated styrene maleic anhydride polymer, brominated epoxy resin, brominated phenoxy resin, decabromobiphenyl, brominated polycarbonate, perbromocyclopentadecane and brominated cross-linked aromatic polymer.

11. The polyamide resin composition according to claim 1, wherein the bromine atom content in (C) is between 15 and 87 wt %.

12. The polyamide resin composition according to claim 1, wherein formula (I) $R^1$ and $R^2$ are heptadecyl groups and m and n are 2.

13. The polyamide resin composition according to claim 1, wherein formula (I) $R^1$ and $R^2$ are henicosyl groups and m and n are 1.

14. The polyamide resin composition according to claim 1, wherein the compound of formula (I) is obtained by reacting a compound of formula (II)

(II)

with a saturated fatty acid having 10 or more carbon atoms.

15. The polyamide resin composition according to claim 14, wherein the saturated fatty acid is selected from the group consisting of decanoic acid, undecanoic acid, dodecanoic acid, tridecanoic acid, tetradecanoic acid, pentadecanoic acid, hexadecanoic acid, heptadecanoic acid, octadecanoic acid, eicosanoic acid, docosanoic acid, tetracosanoic acid, hexacosanoic acid, octacosanoic acid, and triacontanoic acid.

16. The polyamide resin composition of claim 1, wherein (C) is present in an amount of from 1 to 100 parts by weight per 100 parts by weight of (A).

17. The polyamide resin composition of claim 1, wherein (C) is present in an amount of from 10 to 75 parts by weight per 100 parts by weight of (A).

* * * * *